United States Patent
Sandler et al.

(10) Patent No.: US 9,996,211 B2
(45) Date of Patent: Jun. 12, 2018

(54) TECHNIQUES FOR TRANSACTING VIA AN ANIMATED ASSISTANT

(71) Applicants: Lyle Howard Sandler, Morganville, NJ (US); William Lidwell, Houston, TX (US); Jill Butler, Houston, TX (US); Mariel Pina, Houston, TX (US); Jared Thorn, Houston, TX (US)

(72) Inventors: Lyle Howard Sandler, Morganville, NJ (US); William Lidwell, Houston, TX (US); Jill Butler, Houston, TX (US); Mariel Pina, Houston, TX (US); Jared Thorn, Houston, TX (US)

(73) Assignee: NCR Corporation, Atlanta, GA (US)

(*) Notice: Subject to any disclaimer, the term of this patent is extended or adjusted under 35 U.S.C. 154(b) by 196 days.

(21) Appl. No.: 13/739,474

(22) Filed: Jan. 11, 2013

(65) Prior Publication Data
US 2013/0179779 A1     Jul. 11, 2013

Related U.S. Application Data

(60) Provisional application No. 61/585,312, filed on Jan. 11, 2012.

(51) Int. Cl.
*G06F 9/44* (2018.01)
*G06F 17/30* (2006.01)
*G06F 3/0481* (2013.01)
*G06F 3/01* (2006.01)

(52) U.S. Cl.
CPC ............ *G06F 3/0481* (2013.01); *G06F 3/011* (2013.01)

(58) Field of Classification Search
None
See application file for complete search history.

(56) References Cited

U.S. PATENT DOCUMENTS

| | | | |
|---|---|---|---|
| 5,657,462 A * | 8/1997 | Brouwer et al. ............... 715/709 |
| 6,047,261 A * | 4/2000 | Siefert ............... G06Q 10/0639 |
| | | | 702/182 |
| 6,929,176 B2 * | 8/2005 | Wiggins ......................... 235/379 |
| 2003/0058267 A1 * | 3/2003 | Warren ............. G06F 17/30716 |
| | | | 715/705 |
| 2003/0066876 A1 * | 4/2003 | Goldman ........... G06Q 20/4014 |
| | | | 235/379 |
| 2003/0226888 A1 * | 12/2003 | Wiggins ................. G06Q 30/02 |
| | | | 235/375 |
| 2008/0004892 A1 * | 1/2008 | Zucker ............................... 705/1 |
| 2008/0040693 A1 * | 2/2008 | Toyama et al. ............... 715/865 |
| 2008/0266130 A1 * | 10/2008 | Koo ......................... G06Q 30/02 |
| | | | 340/686.6 |
| 2009/0006439 A1 * | 1/2009 | Joseph et al. ................... 707/102 |
| 2010/0313147 A1 * | 12/2010 | Hartman ................. A63F 13/12 |
| | | | 715/757 |

* cited by examiner

*Primary Examiner* — Jeffrey A Gaffin
*Assistant Examiner* — Nhat Huy T Nguyen
(74) *Attorney, Agent, or Firm* — Schwegman, Lundberg & Woessner

(57) ABSTRACT

Techniques for transacting via an animated assistant are provided. A kiosk processes an animated assistant that entices users to approach. Once a user approaches the animated assistant attempts to recognize the user and engages the user via an unspoken universal language using symbol imagery when the user is not recognized. When the user is recognized, the user is engaged via a preferred spoken language. The animated assistant guides the user through one or more automated transactions via the kiosk.

10 Claims, 3 Drawing Sheets

TECHNIQUES FOR TRANSACTING VIA AN ANIMATED ASSISTANT

RELATED APPLICATIONS

The present application is with, a non-provisional to, and claims priority to U.S. Provisional Application No. 61/585,312 entitled: "Essential Services Agent," filed on Jan. 11, 2012; the disclosure of which in its entirety is incorporated by reference herein.

BACKGROUND

Consumers are increasingly using kiosks to conduct business with enterprises. The kiosks come in a variety of sizes and are used for a variety of purposes. Some kiosks are drive through, such as fast food establishments, pharmacies, banks, and the like. Other kiosks are stationary located in gas stations, airlines, grocery stores, department stores, and the like.

In addition, what is considered a kiosk is evolving with today's technology. For example, digital signs now provide advertisements and mechanisms for users to interact with the displays to perform transactions. Such mechanisms include blue tooth communication, Near Field Communication (NFC), Quick Response (QR) code scanning, WiFi communication, and the like. Tablets and phones can also be viewed as a form of kiosks.

Yet, a large segment of society has essentially been left out when it comes to automation and more particularly to kiosk usage. This lack of participation occurs in countries all over the world including the United States of America. Individuals may be illiterate, may not speak a language or dialect being presented on a kiosk, may be technologically adverse, and/or may fear using technology. It is not just for social reasons that getting these individuals to participate in technology is beneficial but also for economic reasons. The market for these individuals is potentially immense and those lacking economic means are likely eligible for governmental benefits. But, no one has effectively attempted to reach this untapped world-wide market to date.

SUMMARY

In various embodiments, techniques for transacting via automated agent are presented. According to an embodiment, a method for transacting via an automated agent is provided.

Specifically, attempting to recognize a user in front of the kiosk via an avatar presented on a display of a kiosk. Symbols and/or buttons are presented on the display for the user to interact with. Next, a non spoken and culturally independent pictorial language is used to engage the user to transact via the kiosk.

DETAILED DESCRIPTION

Figure 1:
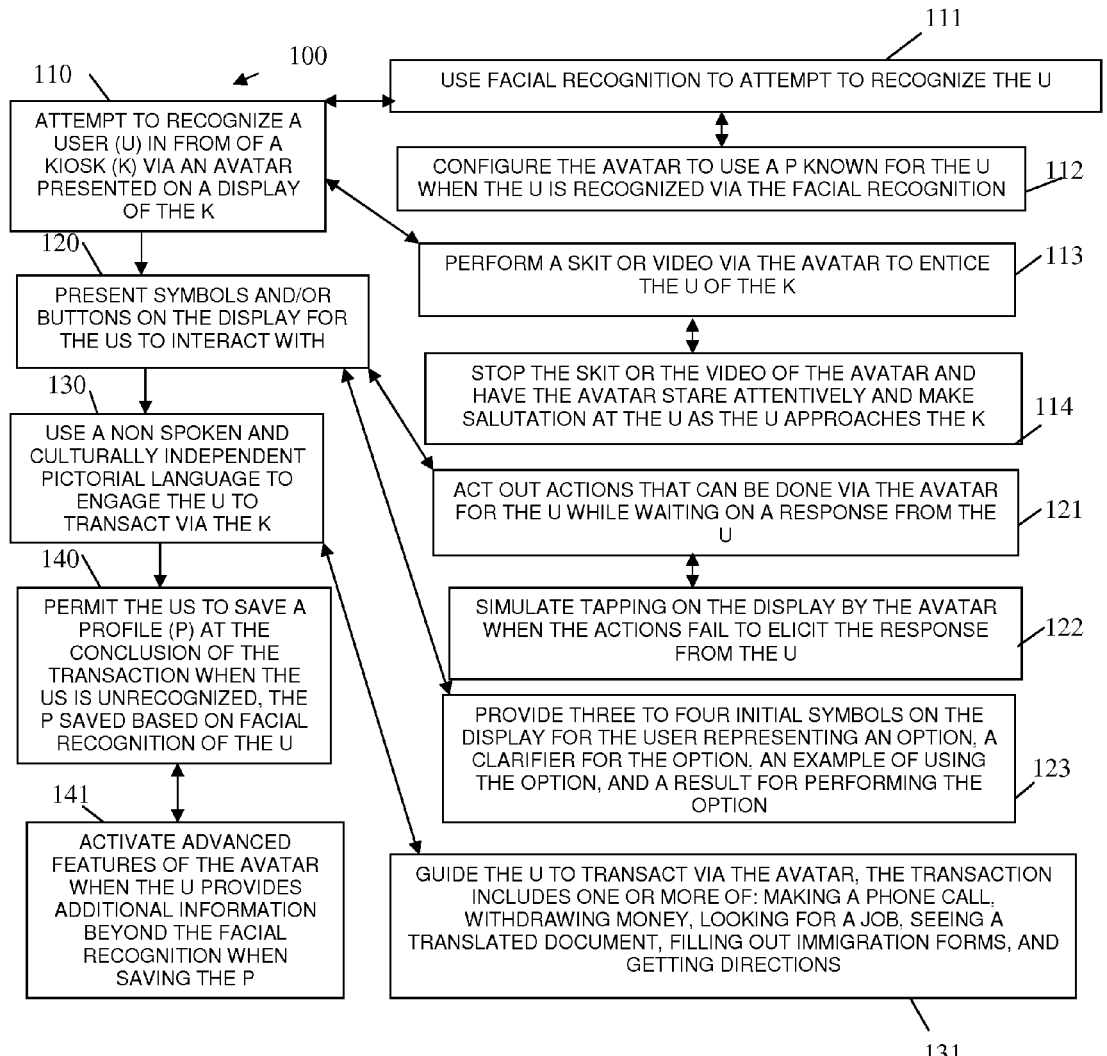
FIG. 1 is a diagram of a method for transacting via an automated agent, according to an example embodiment.

FIG. 1 is a diagram of a method 100 for transacting via an automated agent, according to an example embodiment. The method 100 (hereinafter "animated agent") is implemented as instructions programmed and residing on a non-transitory computer-readable (processor-readable) storage medium and executed by one or more processors. The processors are specifically configured and programmed to process the animated agent. The animated agent may also operate over a network. The network is wired, wireless, or a combination of wired and wireless.

The animated agent executes on one or more processors of a kiosk. A kiosk includes a variety of integrated devices, such as display (e.g, touch screen, etc.), scanner, camera, microphone, card swipe device, and/or in some instances a cash/coin accepter device. The kiosk can be a standalone machine, a tablet affixed to a fixture or movable, a laptop, a phone, or other type of multifunctional device.

As used herein the phrase "animated agent" may be used interchangeably and synonymously with the term "avatar." An avatar is a graphical representation in two or three dimensions that represents a character, such as a user, teacher, instructor, and the like.

At 110, the animated agent attempts to recognize a user in front of the kiosk via an avatar presented on a display of the kiosk. The avatar is a graphical presentation presented on the display for interaction with the user. The kiosk can be a fixed device or a portable device, such as a tablet or laptop situated for use by users in a specific geographical location.

According to an embodiment, at 111, the animated agent uses facial recognition, via a camera integrated into the kiosk, when attempting to recognize the user.

Continuing with the embodiment of 111 and at 112, the animated agent configures the avatar to use a profile known for the user when the user is recognized via the facial recognition.

In an embodiment, at 113, the animated agent performs a predefined skit or video via the avatar on the display to entice the user to approach the kiosk. In other words the animated agent develops an approach behavior for approaching the user.

Continuing with the embodiment of 113 and at 114, the animated agent stops the skit or the video of the avatar and has the avatar stare attentively at the user and waves or presents a culturally appropriate salutation to the user as the user approaches.

At 120, the animated agent presents symbols and/or buttons on the display for the user to interact with. Buttons can be based on a profile for the user when the user is recognized. The symbols are a universal pictorial language that is independent of language and culture.

According to an embodiment, at 121, the animated agent acts out actions that can be done via the avatar for the user to see while waiting on a response from the user. This is done to get the user to engage with the avatar to perform a transaction.

Continuing with the embodiment of 121 and at 122, the animated agent simulates tapping on glass of the kiosk display (sound can be used as well as visual simulation); this is done via the avatar when the actions fail to elicit the response from the user.

In another case, at 123, the animated agent provides three to four core initial symbols on the display for the user representing an option, a clarifier for the option, an example of using the option, and a result for performing the option.

At 130, the animated agent uses a non-spoken and culturally independent pictorial language to engage the user to transact via the kiosk.

In an embodiment, at 131, the animated agent guides the user to transact via the avatar. The transaction includes one or more of: making a phone call, withdrawing money, looking for a job, seeing a translated document (from one spoken language to another different spoken language), filling out immigration forms, and/or getting directions.

Figure 2:
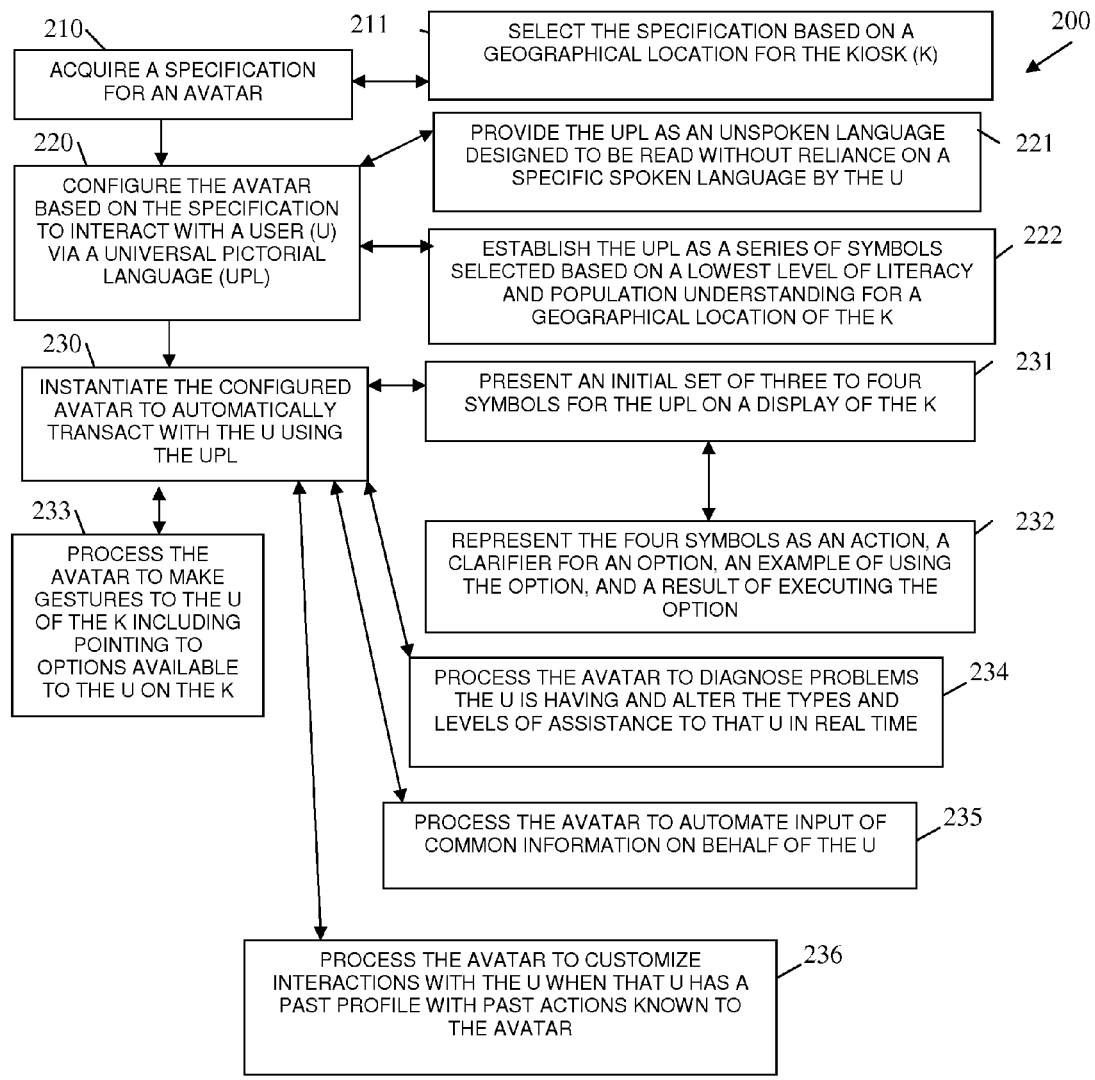
FIG. 2 is a diagram of another method for transacting via an automated agent, according to an example embodiment.

FIG. 2 is a diagram of another method 200 for transacting via an automated agent, according to an example embodiment. The method 200 (hereinafter "kiosk front-end interface") is implemented as instruction and programmed within a non-transitory computer-readable (processor-readable) storage medium that executes on one or more processors of a kiosk (e.g., display, perhaps touch screen, scanner, camera, microphone, card swipe device, and/or a cash/coin accepter device, etc.); the processors of the kiosk are specifically configured to execute the kiosk front-end interface. The kiosk front-end interface may also be operational over a network; the network is wired, wireless, or a combination of wired and wireless.

The kiosk front-end interface presents another and in some ways enhanced processing perspective of the animated agent represented by the method 100 and discussed above with reference to the FIG. 1.

At 210, the kiosk front-end interface acquires a specification from an avatar. This can be done on boot up via a file or can be done dynamically via contact with a server.

In an embodiment, at 211, the kiosk front-end interface selects the specification based on a geographical location for the kiosk. So, the specification for New York City is different than the specification for a city in Somalia.

At 220, the kiosk front-end interface configures the avatar based on the specification to interact with a user via a universal pictorial language.

According to an embodiment, at 221, the kiosk front-end interface provides the universal pictorial language as an unspoken language designed to be read without reliance on a specific spoken language by the user.

In another case, at 222, the kiosk front-end interface establishes the universal pictorial language as a series of symbols selected based on a lowest level of literacy and population understanding for a geographical location of the kiosk.

At 230, the kiosk front-end interface instantiates and loads the configured avatar to automatically transact with the user using the universal pictorial language.

In an embodiment, at 231, the kiosk front-end interface presents an initial set of three to four symbols for the universal pictorial language on a display of the kiosk.

Continuing with the embodiment of 231 and at 232, the kiosk front-end interface represents the four symbols as an action, a clarifier from an option, an example for using the option, and a result of executing the option.

In an embodiment, at 233, the kiosk front-end interface processes the avatar to make gestures to a user of the kiosk including pointing to options available to the user on the kiosk.

In another case, at 234, the kiosk front-end interface processes the avatar to diagnose problems a user is having and alter the types and levels of assistance to that user in real time.

According to an embodiment, at 235, the kiosk front-end interface processes the avatar to automate input of common information on behalf of the user.

Also, in an embodiment, at 236, the kiosk front-end interface processes the avatar to customize interactions with a user when that user has a past profile with past actions known to the avatar.

Figure 3:
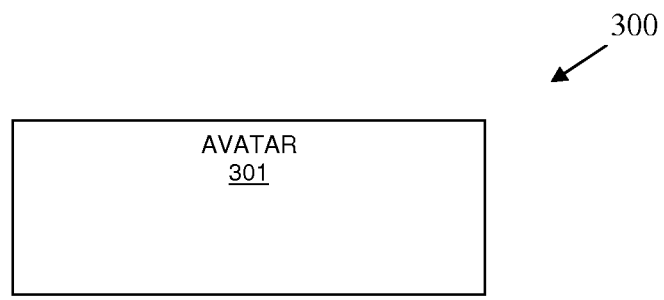
FIG. 3 is a diagram of automated agent kiosk system, according to an example embodiment.

FIG. 3 is a diagram of automated agent kiosk system 300, according to an example embodiment. The components of the automated agent kiosk system 300 are implemented as executable instructions and programmed within a non-transitory computer-readable (processor-readable) storage medium that execute on one or more processors of a kiosk (e.g., self-service kiosk and component devices, etc.); the processors of the kiosk are specifically configured to execute the components of the automated agent kiosk system 300. The automated agent kiosk system 300 may also be operational over a network; the network is wired, wireless, or a combination of wired and wireless.

The automated agent kiosk system 300 includes an avatar 301.

In an embodiment, the automated agent kiosk system 300 implements, inter alia, the methods 100 and 200 of the FIGS. 1 and 2, respectively.

The automated agent kiosk system 300 includes one or more processors having memory and non-transitory computer-readable storage media. The memory and/or the non-transitory computer-readable storage media are programed with executable instructions representing the avatar 301. The executable instructions executed on the one or more processors. Example processing associated with the avatar 301 was presented above with respect to the methods 100 and 200 of the FIGS. 1 and 2, respectively.

The avatar 301 is configured to recognize and engage users via a universal pictorial language to guide the users to complete transactions on the kiosk.

According to an embodiment, the avatar 301 is also configured to recognize the users via facial recognition and save profiles based on the facial recognition.

Continuing with the previous embodiment, the avatar 301 is configured to slow down and speed up the transactions via usage of symbols and based on a perceived understanding of the users during the transactions. So, if the understanding of the user is critical during a portion of a given transaction, the avatar 301 can intentionally use symbols requiring more understanding and thinking by the user to slow the user down. Conversely, when a user appears to completely understand a transaction and wants to use specific symbols to speed things up, the avatar 301 can do this as well. The avatar 301 uses responses and any previous profiles associated with the user to determine whether to slow down or speed up transactions.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and/or memory and to execute on one or more processors of a kiosk configured to execute the method, comprising:

attempting, via the kiosk, to recognize a user in front of the kiosk via an avatar presented on a display of the kiosk, wherein the avatar is an animated and interactive presentation presented on the display representing an instructor;

presenting, by the avatar, symbols and/or buttons on the display for the user to interact with and customizing the symbols and buttons on the display based on a profile for the user when the user is recognized and based on the profile and specific responses of the user: 1) determining, by the avatar, when to present specific symbols requiring more understanding to slow user interaction down when user understanding is critical to a portion of a given transaction and 2) determining, by the avatar, when to present other symbols requiring less understanding to speed the user interaction up when user understanding is less critical to another portion of the given transaction, and wherein presenting further includes providing three to four initial symbols on the display for the user representing an option, a clarifier for the option, an option clarifier for the clarifier that provides an example of using the option, and a result for performing the option, and wherein presenting further includes presenting the option, the clarifier, the option clarifier, and the result together on the display simultaneously with arrow transitions between the option, the clarifier, the option clarifier, and the result moving left to right on the display, and wherein the four initial symbols are used when the given transaction includes multiple options, and wherein three initial symbols are used when one of the clarifier and option clarifier are not needed together and when the clarifier is not present the option clarifier is present; and using, via the kiosk, a non-spoken and culturally independent pictorial language to engage the user to transact via the kiosk by interacting with the symbols and buttons.

2. The method of claim 1, wherein attempting further includes using facial recognition to attempt to recognize the user.

3. The method of claim 2, wherein using further includes configuring the avatar to use the profile known for the user when the user is recognized via the facial recognition.

4. The method of claim 1, wherein attempting further includes performing a skit or video via the avatar to entice the user to the kiosk.

5. The method of claim 4, wherein performing further includes stopping the skit of the video of the avatar and having the avatar stare attentively and present a culturally appropriate salutation to the user as the user approaches the kiosk.

6. The method of claim 1, wherein presenting further includes acting out actions that can be done via the avatar for the user while waiting on a response from the user.

7. The method of claim 6, wherein acting further includes simulating tapping on the display by the avatar when the actions fail to elicit the response from the user.

8. The method of claim 1, wherein using further includes guiding the user to transact via the avatar, wherein a transaction includes one or more of: making a phone call, withdrawing money, looking for a job, seeing a translated document, filling out immigration forms, and getting directions.

9. The method of claim 1 further comprising, permitting the user to save a particular profile at the conclusion of the transaction when the user is unrecognized via one option, the particular profile saved based on facial recognition of the user.

10. The method of claim 9 further comprising, activating advanced features of the avatar when the user provides additional information beyond the facial recognition when saving the particular profile.

\* \* \* \* \*